(12) United States Patent
Anders et al.

(10) Patent No.: US 10,713,849 B2
(45) Date of Patent: Jul. 14, 2020

(54) AUGMENTED REALITY MASKING

(71) Applicant: International Business Machines Corporation, Armonk, NY (US)

(72) Inventors: Kelley Anders, East New Market, MD (US); Al Chakra, Apex, NC (US); Liam S. Harpur, Dublin (IE); Robert H. Grant, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 46 days.

(21) Appl. No.: 15/991,229

(22) Filed: May 29, 2018

(65) Prior Publication Data

US 2019/0371065 A1    Dec. 5, 2019

(51) Int. Cl.
| | |
|---|---|
| *G06T 19/00* | (2011.01) |
| *G06F 11/34* | (2006.01) |
| *H04L 29/08* | (2006.01) |
| *G02B 27/01* | (2006.01) |

(52) U.S. Cl.
CPC ........ *G06T 19/006* (2013.01); *G02B 27/0172* (2013.01); *G06F 11/3485* (2013.01); *H04L 67/306* (2013.01); *G02B 2027/014* (2013.01); *G02B 2027/0141* (2013.01)

(58) Field of Classification Search
CPC .......... G06T 19/006; G02B 2027/0141; G02B 2027/014; G02B 27/0172; G06F 11/3485; H04L 67/306
See application file for complete search history.

(56) References Cited

U.S. PATENT DOCUMENTS

| | | |
|---|---|---|
| 7,073,129 B1 | 7/2006 | Robarts et al. |
| 8,156,116 B2 | 4/2012 | Graham et al. |
| 2003/0146922 A1 | 8/2003 | Navab et al. |
| 2009/0167787 A1 | 7/2009 | Bathiche et al. |
| 2013/0044128 A1 | 2/2013 | Liu et al. |
| 2013/0050432 A1 | 2/2013 | Perez et al. |
| 2013/0083003 A1 | 4/2013 | Perez et al. |
| 2013/0093788 A1 | 4/2013 | Liu et al. |
| 2014/0204117 A1 | 7/2014 | Kinnebrew et al. |

OTHER PUBLICATIONS

Julier et al., "Information Filtering for Mobile Augmented Reality", 2000 IEEE International Symposium on Augmented Reality, Oct. 2000, 11 pages.

(Continued)

*Primary Examiner* — Nicholas R Wilson
(74) *Attorney, Agent, or Firm* — Yee & Associates, P.C.

(57) ABSTRACT

Modifying augmented reality viewing is provided. It is determined that a user is viewing a scene space via augmented reality at a current geographic location of the user. It is detected that the viewing of the scene space is suboptimal for the user based on at least one of overcrowding of the viewed scene space at the current geographic location and significant battery usage to support augmented reality processing. Priority of one or more masks associated with the viewing of the scene space by the user is determined based on a user profile. The one or more masks associated with the viewing of the scene space are implemented based on the current geographic location of the user and the user profile. The one or more masks indicate that a portion of the viewed scene space is not to be processed for the viewing of the scene space via augmented reality.

20 Claims, 5 Drawing Sheets

(56) References Cited

OTHER PUBLICATIONS

Feiner et al., "Knowledge-Based Augmented Reality", Communications of the ACM, vol. 36, No. 7, Jul. 1993, 10 pages.

Tatzgern et al., "Adaptive Information Density for Augmented Reality Displays", 2016 IEEE Virtual Reality (VR), Mar. 2016, 10 pages.

Grubert et al., "Towards Pervasive Augmented Reality: Context-Awareness in Augmented Reality", IEEE Transactions on Visualization and Computer Graphics, vol. 23, No. 6, Jun. 1, 2017, 19 pages.

Bell et al., "Visualization Viewpoints", IEEE Computer Graphics and Applications, vol. 22, No. 4, Aug. 2002, 4 pages.

"A Method to Detect & Prevent Distractions to a User Using Augmented Reality", IP.com Prior Art Database Technical Disclosure No. IPCOM000247421D, Sep. 6, 2016, 6 pages.

"System for determining maskable and unmaskable background regions in an AR system", IP.com Prior Art Database Technical Disclosure No. IPCOM000192207D, Jan. 20, 2010, 2 pages.

"Method for Self-Adaptive Transparency Level Change in Transparent Display", IP.com Prior Art Database Technical Disclosure No. IPCOM000240977D, Mar. 16, 2015, 4 pages.

"Delivery of AR Content When Traveling", IP.com Prior Art Database Technical Disclosure No. IPCOM000220220D, Jul. 25, 2012, 3 pages.

CURRENT CONTEXT
THRESHOLD TABLE
300

| ENTITY | Current_Context | THRESHOLD | RECOMMENDATION |
|---|---|---|---|
| Jane_123 | 12% PROBABLE SCENE FOCUS | 10% PROBABLE SCENE FOCUS | Enable_Scene_Masking |
| Battery_Drain | 57% CPU3 AVERAGE USAGE | 50% CPU3 AVERAGE USAGE | Enable_Scene_Masking |

302 — ENTITY
304 — Current_Context
306 — THRESHOLD
308 — RECOMMENDATION
310 — Jane_123
312 — Battery_Drain

FIG. 3

LOCATION-TO-MASK
MAPPING
400

| LOCATION OR Object_IDs | MASK | Mask_Attributes |
|---|---|---|
| 53.2734<br>-7.778320310000026<br>54 m<br>OR<br>N9TT-9G0A-B7FQ-RANC<br>QK6A-JI6S-7ETR-0A6C<br>SXFP-CHYK-ONI6-S89U<br>XNSS-HSJW-3NGU-8XTJ<br>NHLE-L6MI-4GE4-ETEV<br>6ETI-UIL2-9WAX-XHYO<br>2E62-E3SR-33FI-XHV3<br>7EIQ-72IU-2YNV-3L4Y | 4124g | MASK SIZE:x6723y323<br>OPACITY:34%<br>PROXIMITY:20px<br>TEMPORAL AVAILABILITY:12sec |
| 53.2<br>-9.77<br>OR<br>M6J5-DS2L-KVKT<br><br>P59T-UVEE-M3WB<br>PFQ4-5GSG-967Z<br>PN2B-FQGM-NVQE<br>PS2H-2QFN-4G2N | 4727h | MASK SIZE:x4523y323<br>OPACITY:36%<br>PROXIMITY:10px<br>TEMPORAL AVAILABILITY:19sec |

402 — LOCATION OR Object_IDs
404 — MASK
406 — Mask_Attributes

FIG. 4

AUGMENTED REALITY MASKING

BACKGROUND

1. Field

The disclosure relates generally to augmented reality and more specifically to modifying augmented reality viewing of a scene space using a set of masks to increase device performance and user satisfaction.

2. Description of the Related Art

Augmented reality devices, also known as mixed reality devices, may be used in a variety of real-world environments and contexts. Such augmented reality devices may provide a user with a real-time view of the physical world around the user and may augment the real-time view with holographic overlays or images and other information. Sometimes large amounts of information associated with a particular geographic location within view of a user may be available for presentation to the user on an augmented reality device. With so much information available, managing the presentation of this information to the user, and the user's interaction with such information, may be challenging. For example, presenting too much information may clutter the user's augmented reality viewing experience and overload the user, which may make it difficult for the user to quickly process the information. Additionally, information and alerts displayed by augmented reality systems may cover up important real-life objects, such as, for example, emergency vehicles, trip hazards, or open manhole covers, in the scene space.

SUMMARY

According to one illustrative embodiment, a method for modifying augmented reality viewing is provided. It is determined that a user is viewing a scene space via augmented reality at a current geographic location of the user. It is detected that the viewing of the scene space is suboptimal for the user based on at least one of overcrowding of the viewed scene space at the current geographic location of the user and significant battery usage to support augmented reality processing. Priority of one or more masks associated with the viewing of the scene space by the user is determined based on a user profile. The one or more masks associated with the viewing of the scene space are implemented based on the current geographic location of the user and the user profile. The one or more masks indicate that a portion of the viewed scene space is not to be processed for the viewing of the scene space via augmented reality. According to other illustrative embodiments, a data processing system and computer program product for modifying augmented reality viewing are provided.

BRIEF DESCRIPTION OF THE DRAWINGS

FIG. 3 is a diagram illustrating an example of current context threshold table in accordance with an illustrative embodiment;

FIG. 4 is a diagram illustrating an example of location-to-mask mapping in accordance with an illustrative embodiment;

DETAILED DESCRIPTION

Figure 1:
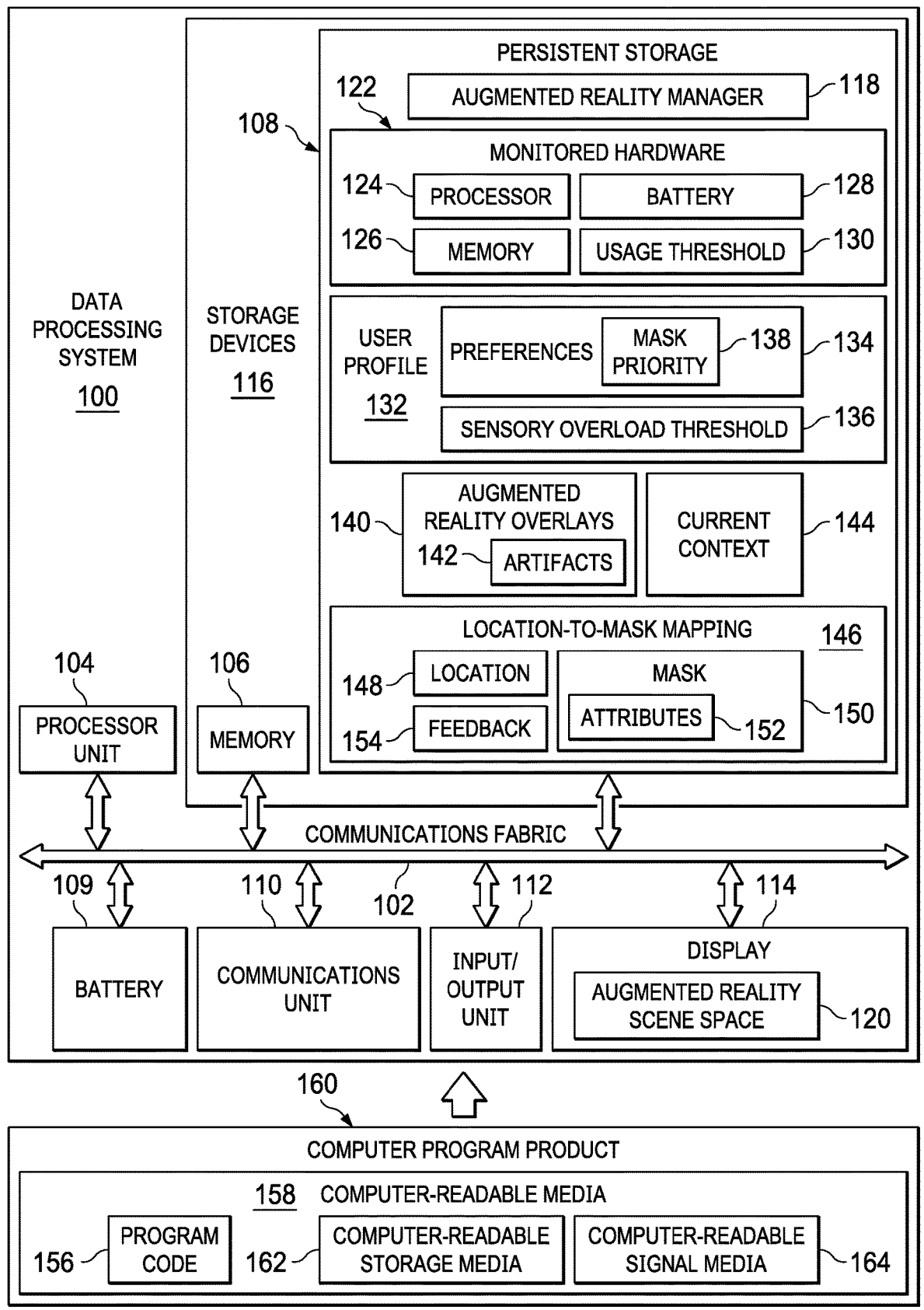
FIG. 1 is a diagram of a data processing system in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIG. 1, a diagram of a data processing environment is provided in which illustrative embodiments may be implemented. It should be appreciated that FIG. 1 is only meant as an example and is not intended to assert or imply any limitation with regard to environments in which different embodiments may be implemented. Many modifications to the depicted environment may be made.

FIG. 1 is a diagram of a data processing system in accordance with an illustrative embodiment. Data processing system 100 is an example of a mobile augmented reality device, such as a head-mounted augmented reality device, in which computer readable program code or instructions implementing processes of illustrative embodiments may be located. A head-mounted augmented reality device may be, for example, augmented reality glasses, goggles, helmet, or the like. In this illustrative example, data processing system 100 includes communications fabric 102, which provides communications between processor unit 104, memory 106, persistent storage 108, battery 109, communications unit 110, input/output (I/O) unit 112, and display 114.

Processor unit 104 serves to execute instructions for software applications and programs that may be loaded into memory 106. Processor unit 104 may be a set of one or more hardware processor devices or may be a multi-processor core, depending on the particular implementation.

Memory 106 and persistent storage 108 are examples of storage devices 116. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 106, in these examples, may be, for example, a random-access memory, or any other suitable volatile or non-volatile storage device. Persistent storage 108 may take various forms, depending on the particular implementation. For example, persistent storage 108 may contain one or more devices. For example, persistent storage 108 may be a hard disk drive, a solid-state drive, a flash memory, or some combination of the above. The media used by persistent storage 108 may be removable. For example, a removable hard drive may be used for persistent storage 108.

In this example, persistent storage 108 stores augmented reality manager 118. However, it should be noted that even though augmented reality manager 118 is illustrated as residing in persistent storage 108, in an alternative illustrative embodiment augmented reality manager 118 may be a separate component of data processing system 100. For example, augmented reality manager 118 may be a hardware component coupled to communication fabric 102 or a combination of hardware and software components. In another alternative illustrative embodiment, a first portion of augmented reality manager 118 may be located on data processing system 100 and a second portion of augmented reality manager 218 may be located on a second data processing system, such as, for example, a smart phone. In yet another alternative illustrative embodiment, augmented reality manager 118 may be located in the smart phone instead of, or in addition to, data processing system 100.

Augmented reality manager 118 controls the process of presenting augmented reality scene space 120 in display 114. Augmented reality scene space 120 represents a real-world scene, area, or location that a user of data processing system 200 is viewing via augmented reality. In addition, augmented reality manager 118 may modify augmented reality viewing of the scene space by the user using a set of one or more masks to increase device performance and user satisfaction by decreasing monitored hardware usage and preventing user sensory overload.

Monitored hardware 122 represents a set of hardware, such as processor 124, memory 126, and battery 128, of data processing system 100 that augmented reality manager 118 monitors for current real-time usage levels. Processor 124, memory 126, and battery 128 represent processor unit 104, memory 106, and battery 109, respectively. Usage thresholds 130 represent maximum threshold level values for each of monitored hardware 122. In other words, usage thresholds 130 represent physical constraints of data processing system 200 with regard to processor unit 104, memory 106, and battery 109. Thus, a maximum threshold level value is a physical performance limitation for each of processor unit 104, memory 106, and battery 109.

User profile 132 represents a profile that corresponds to the user of data processing system 100. However, it should be noted that user profile 132 may represent a plurality of different user profiles corresponding to a plurality of different users of data processing system 100. In this example, user profile 132 includes preferences 134 and sensory overload threshold 136. However, it should be noted that user profile 132 may include other information as well. For example, user profile 132 may include user identification information, historical data corresponding to augmented reality viewing by the user, and the like.

Preferences 134 represent a set of preferences of the user regarding, for example, how, when, and where the user likes to view augmented reality overlays and masks in augmented reality scene space 120. For example, the user may prefer to view overlays and masks in a particular color at a particular geographic location or during a particular time of day. For example, the user may prefer to view overlays and masks in brighter colors during nighttime hours when in a darkened outdoor environment.

In this example, preferences 134 also include mask priority 138. Mask priority 138 represents a user-defined priority for masking a particular portion or segment of augmented reality scene space 120. Sensory overload threshold 136 represents a maximum threshold level value indicating a point at which the user's visual capacity to perceive is decreased because too much information is being presented in augmented reality scene space 120. In other words, sensory overload threshold 136 may represent a user-defined maximum number of augmented reality artifacts that augmented reality manager 118 may present to the user in augmented reality scene space 120 at any one time. In addition, the user may define a different sensory overload threshold for each of a plurality of different geographic locations.

Augmented reality overlays 140 include artifacts 142 that augmented reality manager 118 may superimpose over augmented reality scene space 120 for the user's convenience and use. Artifacts 142 may include, for example, augmented reality markers, augmented reality alerts, augmented reality objects, augmented reality entities, and other types of augmented reality information.

Current context 144 represents a current context of the user of data processing system 100 and a current context of monitored hardware 122. The current context of the user may include, for example, current geographic location, activity and/or cognitive state of the user. The current context of monitored hardware 122 may include, for example, usage and performance level of processor unit 104, available space in memory 106, and power level and rate of power drain of battery 109. Battery 109 provides an internal power source for data processing system 100.

Augmented reality manager 118 compares the current context of the user and the monitored hardware with different thresholds. When augmented reality manage 118 detects that the current context of the user and/or the monitored hardware exceeds one or more of the thresholds, augmented reality manager 118 utilizes location-to-mask mapping 146 to map location 148 to mask 150. Location 148 represents the current geographic location of data processing system 100 when one or more of the thresholds were exceeded. Mask 150 corresponds to location 148. Mask 150 may represent a set of one or more masks. Mask 150 directs augmented reality manager 118 not to process all or a portion of the scene space for augmented reality that is associated with mask 150.

Augmented reality manager 118 generates mask 150 based on attributes 152. Attributes 152 may include, for example, size, opacity, temporal availability, proximity, color, and the like. It should be noted that each specific mask may have a different set of corresponding attributes. Also, it should be noted that each specific geographic location may have a different set of corresponding masks.

After generating mask 150, augmented reality manager 118 receives feedback 154 from the user of data processing system 100 and/or from data processing system 100, itself, regarding effectiveness of mask 150 in reducing the user's sensory overload below threshold 136 and/or decreasing the monitored hardware's usage below thresholds 130. In addition, augmented reality manager 118 may utilize feedback 154 to automatically adjust sensory overload threshold 136 and/or usage thresholds 130 to optimize the user's utilization of data processing system 100 and to increase performance of data processing system 100.

Communications unit 110, in this example, provides for communication with other data processing systems and devices, such as, for example, servers, handheld computers, smart phones, smart watches, and the like, via a network. The network may be, for example, an internet, an intranet, a wide area network, a local area network, a personal area network, or any combination thereof. Communications unit 110 may provide communications through the use of both physical and wireless communications links. The physical communications link may utilize, for example, a wire, cable, universal serial bus, or any other physical technology to establish a physical communications link for data processing system 100. The wireless communications link may utilize, for example, shortwave, high frequency, ultra high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 100.

Input/output unit 112 allows for the input and output of data with other devices that may be connected to data processing system 100. For example, input/output unit 112 may provide a connection for user input through a microphone, a touchpad, a keypad, a keyboard, a mouse, and/or some other suitable input device. Display 114 provides a mechanism to display information, such as augmented reality artifacts overlaid on a real-world scene space, to a user and may include touch screen capabilities to allow the user to make on-screen selections through user interfaces or input data, for example.

Instructions for the operating system, applications, and/or programs may be located in storage devices 116, which are in communication with processor unit 104 through communications fabric 102. In this illustrative example, the instructions are in a functional form on persistent storage 108. These instructions may be loaded into memory 106 for running by processor unit 104. The processes of the different embodiments may be performed by processor unit 104 using computer-implemented instructions, which may be located in a memory, such as memory 106. These program instructions are referred to as program code, computer usable program code, or computer readable program code that may be read and run by a processor in processor unit 104. The program instructions, in the different embodiments, may be embodied on different physical computer readable storage devices, such as memory 106 or persistent storage 108.

Program code 156 is located in a functional form on computer readable media 158 that is selectively removable and may be loaded onto or transferred to data processing system 100 for running by processor unit 104. Program code 156 and computer readable media 158 form computer program product 160. In one example, computer readable media 158 may be computer readable storage media 162 or computer readable signal media 164. Computer readable storage media 162 may include, for example, an optical or magnetic disc that is inserted or placed into a drive or other device that is part of persistent storage 108 for transfer onto a storage device, such as a hard drive, that is part of persistent storage 108. Computer readable storage media 162 also may take the form of a persistent storage, such as a hard drive, a thumb drive, or a flash memory that is connected to data processing system 100. In some instances, computer readable storage media 162 may not be removable from data processing system 100.

Alternatively, program code 156 may be transferred to data processing system 100 using computer readable signal media 164. Computer readable signal media 164 may be, for example, a propagated data signal containing program code 156. For example, computer readable signal media 164 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 156 may be downloaded over a network to persistent storage 108 from another device or data processing system through computer readable signal media 164 for use within data processing system 100. For instance, program code stored in a computer readable storage media in a data processing system may be downloaded over a network from the data processing system to data processing system 100. The data processing system providing program code 156 may be a server computer, a client computer, or some other device capable of storing and transmitting program code 156.

The different components illustrated for data processing system 100 are not meant to provide architectural limitations to the manner in which different embodiments may be implemented. The different illustrative embodiments may be implemented in a data processing system including components in addition to, or in place of, those illustrated for data processing system 100. Other components shown in FIG. 1 can be varied from the illustrative examples shown. The different embodiments may be implemented using any hardware device or system capable of executing program code. As one example, data processing system 100 may include organic components integrated with inorganic components and/or may be comprised entirely of organic components excluding a human being. For example, a storage device may be comprised of an organic semiconductor.

As another example, a computer readable storage device in data processing system 100 is any hardware apparatus that may store data. Memory 106, persistent storage 108, and computer readable storage media 162 are examples of physical storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

In the course of developing illustrative embodiments, it was discovered that augmented reality wearable devices are driving significant changes in user behaviors. These changes may include, for example, new ways of sharing contact information, combining reality with virtual reality games, overlaying maps and map data on real-world environments, and the like. Augmented reality's combination of live real-world views with virtual artifacts, such as markers, enables useful information to be presented to and acted upon by a user. However, as more augmented reality functionality is applied to a scene space viewed by a user, a cost exists in terms of augmented reality device hardware (e.g., processor, memory, and battery) performance limitations and user perception capabilities.

For example, as more and more augmented reality artifacts, such as augmented reality marker orientation and positioning and additional graphic rendering, are processed in an augmented reality scene space, a computational barrier may be reached affecting performance of the augmented reality device. If all artifacts in an augmented reality field of view are processed, then excessive CPU processing and battery power drain may exist.

As an example scenario, an augmented reality scene space includes a parked car and behind the parked car is a tree full of colorful birds. From a bird watcher's perspective, it is important to focus on the birds in the tree and not on the details of the parked car (i.e., illustrative embodiments may mask the parked car from the bird watcher's augmented reality viewing). From an auto mechanic's perspective, it is important to focus on the details of the car and not on the birds in the tree (i.e., illustrative embodiments may mask the tree from the auto mechanic's augmented reality viewing). Illustrative embodiments optimize the areas of focus of an augmented reality scene space display for a particular user such that physical device constraints and user capacity to perceive are not exceeded while displaying the augmented reality scene space. In other words, illustrative embodiments decrease processor and memory usage, as well as, battery power drain on the augmented reality device, while also decreasing user sensory (e.g., visual) overload.

As another example scenario, a sunny spot exists in augmented reality viewing of a particular geographic location. Illustrative embodiments may leave sunshades at that particular geographic location for other users' benefit so that other users who need the sunshades may use the sunshades to prevent sun glare. The sun glare represents a battery power drain and illustrative embodiments utilize the sun shades to optimize the augmented reality scene space layout to prevent excessive battery power drain on the augmented reality device. Thus, illustrative embodiments may leave a useful object at a particular location for the benefit of other users.

Illustrative embodiments optimize augmented reality scene processing by: 1) detecting objects in an augmented reality scene space for a particular user; 2) analyzing crowd-sourced user sentiment and user reaction to augmented reality scene space masking characteristics (e.g., mask size, mask opacity, proximity of an object to the user, temporal availability of a mask, and the like); and 3) implementing partial or complete masking of objects or areas in a scene space based on the analysis of the crowd-sourced user sentiment and user reaction to the augmented reality scene space masking characteristics. User reaction to masking characteristics may be, for example, a user changing mask settings during display of a mask in a scene space. Temporal availability of a mask may be, for example, when a mask is not available for display because the mask will cover the entire scene space.

Initial default scene space masking characteristics may be pre-fixed by, for example, a user, social network group corresponding to the user, government agency, augmented reality administrator, geolocation-based value (e.g., GPS coordinates), and the like. A government agency may indicate that a particular scene space may not be viewed via augmented reality for security reasons. Illustrative embodiments may utilize a social network group to generate a mask template for scene space areas, objects, and contexts not to process using the augmented reality device when augmented reality processing on the scene space areas, objects, and contexts would produce a negative result, such as processor and memory usage above a threshold or increased user confusion in viewing the scene space. If augmented reality processing on the scene space areas, objects, and contexts produce a negative result, then illustrative embodiments tag the scene space areas, objects, and contexts as "not to be processed" by the augmented reality device. In addition, illustrative embodiments take into account user perspective, such as user safety, user food preferences, user hobbies, and the like, when masking a scene space.

Illustrative embodiments may start a mask from a Laplace-like smoothing (i.e., selecting a starting point as nonzero and subsequently learning thresholds based on device hardware (e.g., processor, memory, and battery) usage limitations and user engagement or efficiency feedback). Illustrative embodiments also may use a social layer that captures historical masking of a scene space or scene spaces having similar characteristics. In addition, illustrative embodiments also may incorporate situational awareness as an input for masking of an augmented reality scene space. For example, if illustrative embodiments determine that a vehicle is rapidly approaching a user on a busy street, then illustrative embodiments disable the augmented reality viewing of the busy street. When illustrative embodiments determine that the vehicle is no longer a concern to the user, then illustrative embodiments reenable the augmented reality viewing of the busy street.

As a result, illustrative embodiments improve the utility of augmented reality devices. Further, illustrative embodiments improve performance of these augmented reality devices by decreasing processor, memory, and battery usage. Furthermore, illustrative embodiments improve attention management of users to augmented reality markers. For example, if illustrative embodiments determine a number of users above a maximum threshold number of users view a particular augmented reality marker over a defined period of time, then illustrative embodiments may make that particular augmented reality marker more visible to users by, for example, increasing an amount of light on that particular augmented reality marker. Similarly, if illustrative embodiments determine a number of users below a minimum threshold number of users view a particular augmented reality marker over a defined period of time, then illustrative embodiments may make that particular augmented reality marker less visible to users by, for example, decreasing an amount of light on that particular augmented reality marker.

As yet another example scenario, a user is utilizing a head-mounted augmented reality device, such as augmented reality glasses, goggles, or helmet, equipped with illustrative embodiments. The user views a crowded street via the head-mounted augmented reality device. The head-mounted augmented reality device may provide multiple augmented reality marker views from various augmented reality providers, which the user is a subscriber of these providers. Illustrative embodiments detect a suboptimal augmented reality viewing of the scene space (i.e., the crowed street) by the user. Illustrative embodiments may detect that an augmented reality scene space is suboptimal based on illustrative embodiments determining that the augmented reality scene space is overcrowded with augmented reality markers and that too much battery power is being used to support the excessive augmented reality processing by the device. Illustrative embodiments map the current geographic location of the device to one or more augmented reality scene space masks.

Illustrative embodiments may develop priority of masks and may use defined thresholds to build different augmented reality layers. Illustrative embodiments may implement masks partially based on the geographic location and user type matching. Illustrative embodiments also may adjust the relative size of the masks based on the scene space at that point in time. Hence, the user's head-mounted augmented reality device is now processing augmented reality artefacts in the scene space such that user and device thresholds are not exceeded.

Moreover, illustrative embodiments may decorate each mask in a set of two or more masks with a different color to differentiate between masks. In addition, a user may place focus on a different mask by rotating the masks based on user gesture, haptic feedback, or a specific touch type. Alternatively, illustrative embodiments may rotate the masks on a timed frequency, at a logarithmic interval such as Layer 1 for 15 seconds, Layer 2 for 25 seconds, and the like. Further, illustrative embodiments may implement a specific user and device feedback loop. If illustrative embodiments detect that the situation changed (e.g., the user went from an outdoor environment to an indoor environment, the user recharged the augmented reality device, and the like), then illustrative embodiments may remove or add an augmented reality artifact between one feedback loop and the next.

Figure 2:
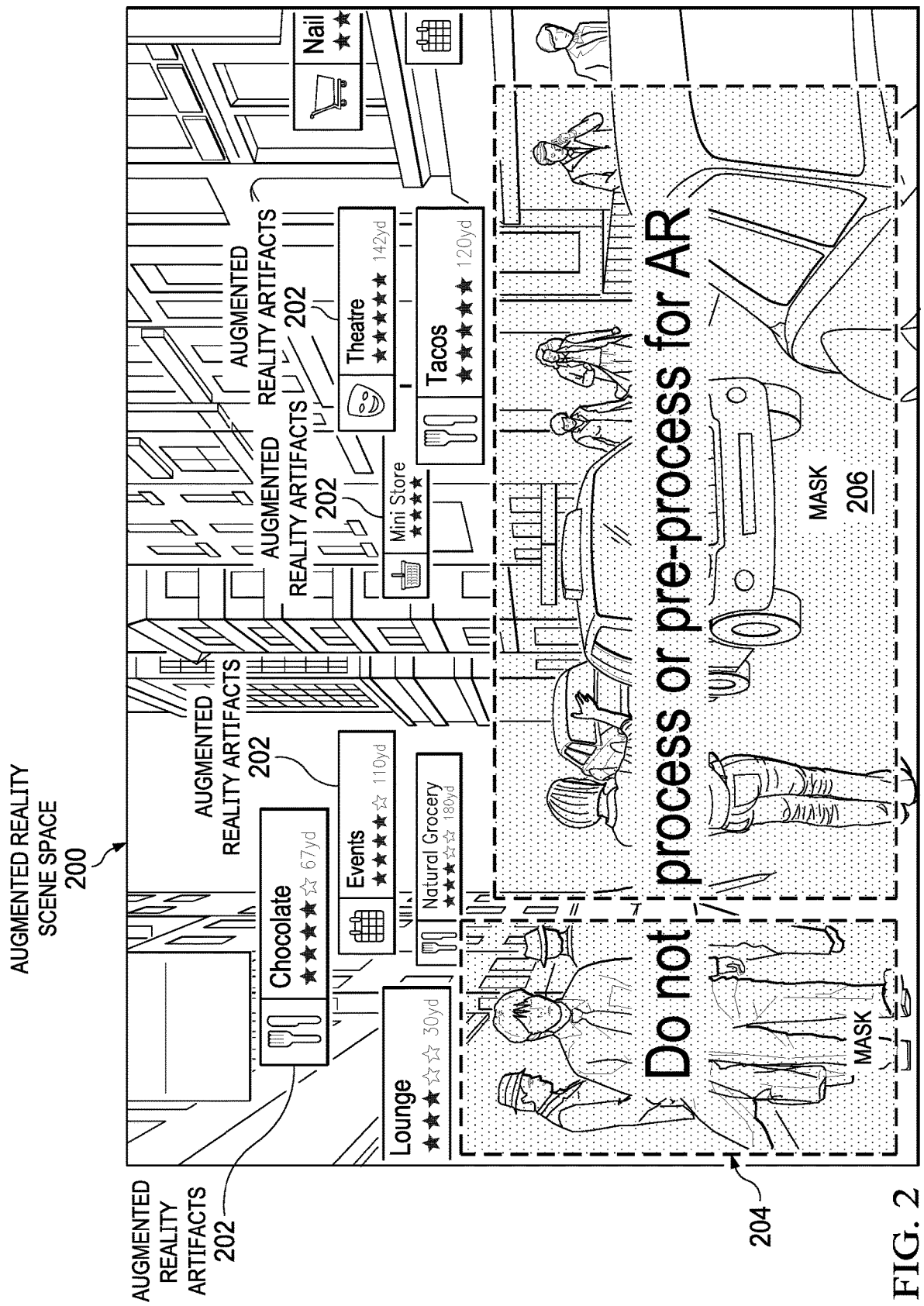
FIG. 2 is a diagram illustrating an example of an augmented reality scene space in accordance with an illustrative embodiment.

With reference now to FIG. 2, a diagram illustrating an example of an augmented reality scene space is depicted in accordance with an illustrative embodiment. Augmented reality scene space 200 may be implemented in a display of a data processing system, such as display 114 of data processing system 100 in FIG. 1. In other words, augmented reality scene space 200 may be, for example, augmented reality scene space 120 in FIG. 1.

In this example, augmented reality scene space 200 is a busy city street crowded with people and vehicles. Also in this example, augmented reality scene space 200 includes augmented reality artifacts 202, mask 204, and mask 406. However, it should be noted that augmented reality scene space 200 may include any number of augmented reality artifacts and masks.

In this example, augmented reality artifacts 202 are markers that indicate names and locations of different businesses along the busy city street. Also, it should be noted that augmented reality artifacts 202 are presented above mask 204 and mask 206. Mask 204 and mask 206 indicate that augmented reality processing and viewing of the busy city street are not to occur in the portions of augmented reality scene space 200 where mask 204 and mask 206 are located. In other words, the user has a clear street-level view of the people and traffic without any augmented reality artifacts to block the view. Further, it should be noted that mask 204 and mask 206 are of different sizes and both have a level of opacity to them.

With reference now to FIG. 3, a diagram illustrating an example of current context threshold table is depicted in accordance with an illustrative embodiment. In this example, current context threshold table 300 includes entity 302, current context 304, threshold 306, and recommendation 308. Also in this example, entity 302 includes user 310 (i.e., Jane 123) and monitored hardware 312 (i.e., battery drain).

Further in this example, current context 304 is 12% probable scene focus, threshold 306 is 10% probable scene focus, and recommendation 308 is enable scene masking for user 310. In other words, current context 304 for user 310 exceeds threshold 306 so scene space augmented reality masking is enabled to enhance user 310's augmented reality viewing experience. In addition, current context 304 is 57% CPU3 average usage, threshold 306 is 50% CPU3 average usage, and recommendation 308 is enable scene masking for monitored hardware 312. In other words, current context 304 for monitored hardware 312 exceeds threshold 306 so scene space augmented reality masking is enabled to decease monitored hardware 312's battery drain.

With reference now to FIG. 4, a diagram illustrating an example of location-to-mask mapping is depicted in accordance with an illustrative embodiment. Location-to-mask mapping 400 may be, for example, location-to-mask mapping 146 in FIG. 1. Location-to-mask mapping 400 includes location or object identifiers 402, mask 404, and mask attributes 406.

Location or object identifiers 402 identifies a specific geographic location or objects corresponding to a particular augmented reality scene space. Mask 404 identifies a particular mask that corresponds to the specific geographic location or objects identified in 402. Mask attributes 406 identify the attributes of the particular mask identified in 404. Mask attributes 406 may include, for example, mask size, opacity, proximity, and temporal availability. Illustrative embodiments utilize location-to-mask mapping 400 to map a specific geographic location or objects to a particular mask and then generate the particular mask for that specific geographic location or objects based on the corresponding mask attributes.

Figure 5:
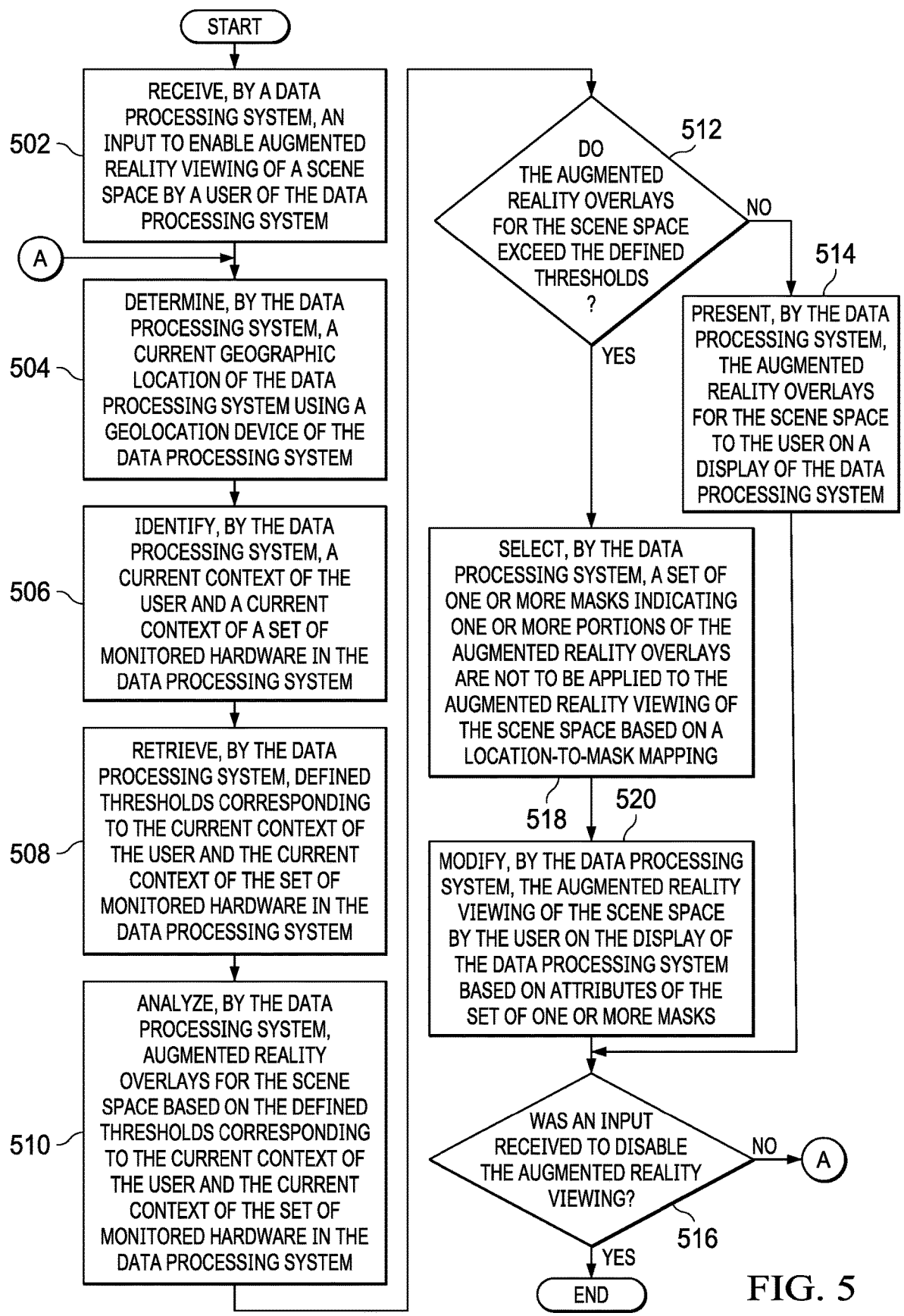
FIG. 5 is a flowchart illustrating a process for modifying augmented reality viewing of a scene space in accordance with an illustrative embodiment.

With reference now to FIG. 5, a flowchart illustrating a process for modifying augmented reality viewing of a scene space is shown in accordance with an illustrative embodiment. The process shown in FIG. 5 may be implemented in a data processing system, such as, for example, data processing system 100 in FIG. 1.

The process begins when the data processing system receives an input to enable augmented reality viewing of the scene space by a user of the data processing system (step 502). The data processing system determines a current geographic location of the data processing system using a geolocation device of the data processing system (step 504). The geolocation device may be, for example, a GPS transceiver.

In addition, the data processing system identifies a current context of the user and a current context of a set of monitored hardware in the data processing system (step 506). The current context of the user may be, for example, a current geographic location of the user, such as at work or at home, a current activity of the user, such as sitting, walking, running, climbing stairs, working, driving, and the like, or a current cognitive state of the user, such as drowsy, alert, distracted, attentive, and the like. The set of monitored hardware may be, for example, a processor, a memory, and a battery, of the data processing system. The current context of the set of monitored hardware may be, for example, a level of usage of each monitored component. For example, a level of processor cycles being consumed per unit time, amount of available memory space, and amount of remaining battery power.

Further, the data processing system retrieves defined thresholds corresponding to the current context of the user and the current context of the set of monitored hardware in the data processing system (step 508). The data processing system analyzes augmented reality overlays for the scene space based on the defined thresholds corresponding to the current context of the user and the current context of the set of monitored hardware in the data processing system (step 510). Then, the computer makes a determination as to whether the augmented reality overlays for the scene space exceed the defined thresholds based on the analysis (step 512).

If the computer determines that the augmented reality overlays for the scene space do not exceed the defined thresholds, no output of step 512, then the data processing system presents the augmented reality overlays for the scene space as is to the user on a display of the data processing system (step 514). Afterward, the computer makes a determination as to whether an input was received to disable the augmented reality viewing (step 516). If the computer determines that an input was not received to disable the augmented reality viewing, no output of step 516, then the process returns to step 504 where the data processing system continues to determine the current geographic location of the data processing system. If the computer determines that an input was received to disable the augmented reality viewing, yes output of step 516, then the process terminates thereafter.

Returning again to step 512, if the computer determines that the augmented reality overlays for the scene space do exceed the defined thresholds, yes output of step 512, then the data processing system selects a set of one or more masks indicating one or more portions of the augmented reality overlays are not to be applied to the augmented reality viewing of the scene space based on a location-to-mask mapping (step 518). Subsequently, the data processing system modifies the augmented reality viewing of the scene space by the user on the display of the data processing system based on attributes of the set of one or more masks (step 520). The attributes of the set of masks may be, for example, mask size, mask opacity, mask temporal availability, object proximity to the user, and the like. Thereafter, the process returns to step 516 where the computer makes a determination as to whether an input was received to disable the augmented reality viewing.

Figure 6:
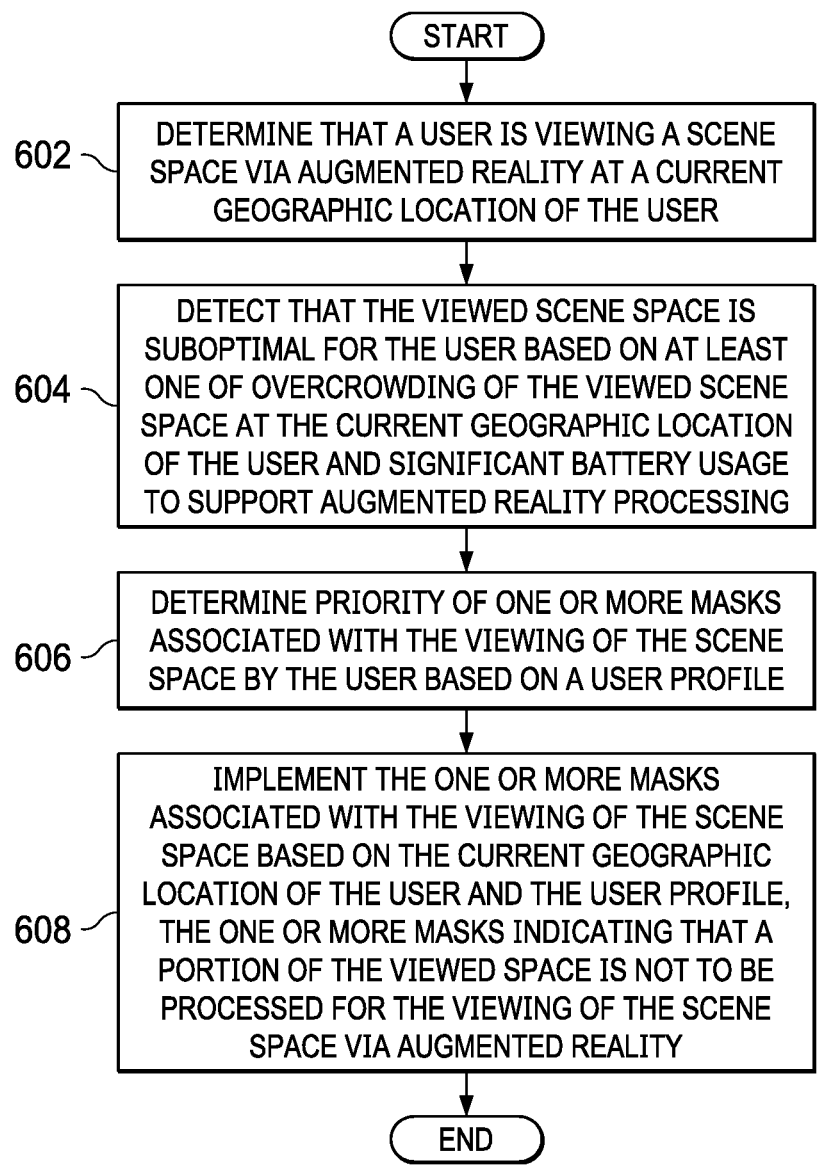
FIG. 6 is a flowchart illustrating a process for implementing masks associated with viewing a scene space via augmented reality in accordance with an illustrative embodiment.

With reference now to FIG. 6, a flowchart illustrating a process for implementing masks associated with viewing a scene space via augmented reality is shown in accordance with an illustrative embodiment. The process shown in FIG. 6 may be implemented in a data processing system, such as, for example, data processing system 100 in FIG. 1.

The process begins when the data processing system determines that a user is viewing the scene space via augmented reality at a current geographic location of the user (step 602). The data processing system detects that the viewing of the scene space is suboptimal for the user based on at least one of overcrowding of the viewed scene space at the current geographic location of the user and significant battery usage to support augmented reality processing (step 604). The data processing system also may detect that the viewed scene space is suboptimal for the user based on preferences in a user profile corresponding to the user and monitored hardware usage thresholds.

In addition, the data processing system determines priority of one or more masks associated with the viewing of the scene space by the user based on the user profile (step 606). Further, the data processing system may learn the priority of the one or more masks based on user feedback. Furthermore, the data processing system may determine the priority of the one or more masks based on historical data corresponding to other users in an area of the current geographic location of the user. Moreover, the data processing system may determine the priority of the one or more masks based on data corresponding to other users having similar profiles as the user. The data processing system also may adjust a size of the one or more masks based on optimal monitored hardware performance and a capacity of the user to perceive augmented reality artifacts in the viewed scene space.

The data processing system implements the one or more masks associated with the viewing of the scene space based on the current geographic location of the user and the user profile (step 608). The one or more masks indicate that a portion of the viewed scene space should not be processed for the viewing of the scene space via augmented reality. Thereafter, the process terminates.

Thus, illustrative embodiments of the present invention provide a method, data processing system, and computer program product for modifying augmented reality viewing of a scene space using a set of masks to increase device performance and user satisfaction. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for modifying augmented reality viewing, the method comprising:
   determining that a user is viewing a scene space via augmented reality at a current geographic location of the user;
   detecting that the viewing of the scene space is suboptimal for the user based on at least one of overcrowding of the viewed scene space at the current geographic location of the user and significant battery usage to support augmented reality processing;
   determining priority of one or more masks associated with the viewing of the scene space by the user based on a user profile; and
   implementing the one or more masks associated with the viewing of the scene space based on the current geographic location of the user and the user profile, wherein the one or more masks indicate that a portion of the viewed scene space is not to be processed for the viewing of the scene space via augmented reality.

2. The method of claim 1 further comprising:
   identifying a current context of the user and a current context of a set of monitored hardware;
   retrieving defined thresholds corresponding to the current context of the user and the current context of the set of monitored hardware;
   analyzing augmented reality overlays for the viewed scene space based on the defined thresholds corresponding to the current context of the user and the current context of the set of monitored hardware; and
   determining whether the augmented reality overlays for the scene space exceed the defined thresholds based on the analyzing.

3. The method of claim 2 further comprising:
   responsive to determining that the augmented reality overlays for the scene space do not exceed the defined thresholds, presenting the augmented reality overlays for the scene space as is to the user on a display.

4. The method of claim 2 further comprising:
   responsive to determining that the augmented reality overlays for the scene space exceed the defined thresholds, selecting the one or more masks indicating that the portion of the viewed scene space is not to be processed for the viewing of the scene space via augmented reality based on a location-to-mask mapping; and
   modifying the augmented reality viewing of the scene space by the user on a display based on attributes of the one or more masks.

5. The method of claim 4, wherein the attributes of the one or more masks are selected from a group consisting of mask size, mask opacity, mask temporal availability, and object proximity to the user.

6. The method of claim 1, wherein the priority of the one or more masks is learned based on user feedback.

7. The method of claim 1, wherein the priority of the one or more masks is determined based on historical data corresponding to other users in an area of the current geographic location of the user.

8. The method of claim 1, wherein the priority of the one or more masks is determined based on data corresponding to other users having similar profiles as the user.

9. The method of claim 1, wherein the scene space is suboptimal for the user based on preferences in the user profile corresponding to the user and monitored hardware usage thresholds.

10. The method of claim 1, wherein a size of the one or more masks is adjusted based on optimal monitored hardware performance and a capacity of the user to perceive augmented reality artifacts in the viewed scene space.

11. A data processing system for modifying augmented reality viewing, the data processing system comprising:
a bus system;
a storage device connected to the bus system, wherein the storage device stores program instructions; and
a processor connected to the bus system, wherein the processor executes the program instructions to:
determine that a user is viewing a scene space via augmented reality at a current geographic location of the user;
detect that the viewing of the scene space is suboptimal for the user based on at least one of overcrowding of the viewed scene space at the current geographic location of the user and significant battery usage to support augmented reality processing;
determine priority of one or more masks associated with the viewing of the scene space by the user based on a user profile; and
implement the one or more masks associated with the viewing of the scene space based on the current geographic location of the user and the user profile, wherein the one or more masks indicate that a portion of the viewed scene space is not to be processed for the viewing of the scene space via augmented reality.

12. The data processing system of claim 11, wherein the processor further executes the program instructions to:
identify a current context of the user and a current context of a set of monitored hardware;
retrieve defined thresholds corresponding to the current context of the user and the current context of the set of monitored hardware;
analyze augmented reality overlays for the viewed scene space based on the defined thresholds corresponding to the current context of the user and the current context of the set of monitored hardware; and
determine whether the augmented reality overlays for the scene space exceed the defined thresholds based on analyzing the augmented reality overlays for the viewed scene space.

13. The data processing system of claim 12, wherein the processor further executes the program instructions to:
present the augmented reality overlays for the scene space as is to the user on a display in response to determining that the augmented reality overlays for the scene space do not exceed the defined thresholds.

14. The data processing system of claim 12, wherein the processor further executes the program instructions to:
select the one or more masks indicating that the portion of the viewed scene space is not to be processed for the viewing of the scene space via augmented reality based on a location-to-mask mapping in response to determining that the augmented reality overlays for the scene space exceed the defined thresholds; and
modify the augmented reality viewing of the scene space by the user on a display based on attributes of the one or more masks.

15. The data processing system of claim 14, wherein the attributes of the one or more masks are selected from a group consisting of mask size, mask opacity, mask temporal availability, and object proximity to the user.

16. A computer program product for modifying augmented reality viewing, the computer program product comprising a computer readable storage medium having program instructions embodied therewith, the program instructions executable by a data processing to cause the data processing to perform a method comprising:
determining that a user is viewing a scene space via augmented reality at a current geographic location of the user;
detecting that the viewing of the scene space is suboptimal for the user based on at least one of overcrowding of the viewed scene space at the current geographic location of the user and significant battery usage to support augmented reality processing;
determining priority of one or more masks associated with the viewing of the scene space by the user based on a user profile; and
implementing the one or more masks associated with the viewing of the scene space based on the current geographic location of the user and the user profile, wherein the one or more masks indicate that a portion of the viewed scene space is not to be processed for the viewing of the scene space via augmented reality.

17. The computer program product of claim 16 further comprising:
identifying a current context of the user and a current context of a set of monitored hardware;
retrieving defined thresholds corresponding to the current context of the user and the current context of the set of monitored hardware;
analyzing augmented reality overlays for the viewed scene space based on the defined thresholds corresponding to the current context of the user and the current context of the set of monitored hardware; and
determining whether the augmented reality overlays for the scene space exceed the defined thresholds based on the analyzing.

18. The computer program product of claim 17 further comprising:
responsive to determining that the augmented reality overlays for the scene space do not exceed the defined thresholds, presenting the augmented reality overlays for the scene space as is to the user on a display.

19. The computer program product of claim 17 further comprising:
responsive to determining that the augmented reality overlays for the scene space exceed the defined thresholds, selecting the one or more masks indicating that the portion of the viewed scene space is not to be processed for the viewing of the scene space via augmented reality based on a location-to-mask mapping; and
modifying the augmented reality viewing of the scene space by the user on a display based on attributes of the one or more masks.

20. The computer program product of claim 19, wherein the attributes of the one or more masks are selected from a group consisting of mask size, mask opacity, mask temporal availability, and object proximity to the user.

* * * * *